P. H. Roots.
Turbine Wheel.

No. 918. Reissued Feb. 28, 1860.

Witnesses,
Ph. Tuch
W. Kauffman

Inventor:
P. H. Roots

N. PETERS, PHOTO-LITHOGRAPHER, WASHINGTON, D. C.

UNITED STATES PATENT OFFICE.

P. H. ROOTS, OF CONNERSVILLE, INDIANA.

IMPROVED WATER-WHEEL.

Specification forming part of Letters Patent No. 23,267, dated March 15, 1859; Reissue No. 918, dated February 28, 1860.

*To all whom it may concern:*

Be it known that I, P. H. ROOTS, of Connersville, in the county of Fayette and State of Indiana, have invented a new and Improved Water-Wheel; and I do hereby declare that the following is a full, clear, and exact description of the same, reference being had to the annexed drawings, making a part of this specification, in which—

Figure 1:
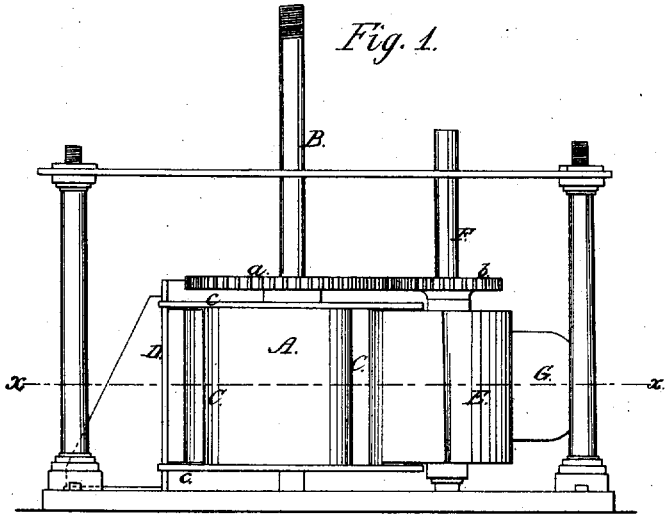
Figure 2:
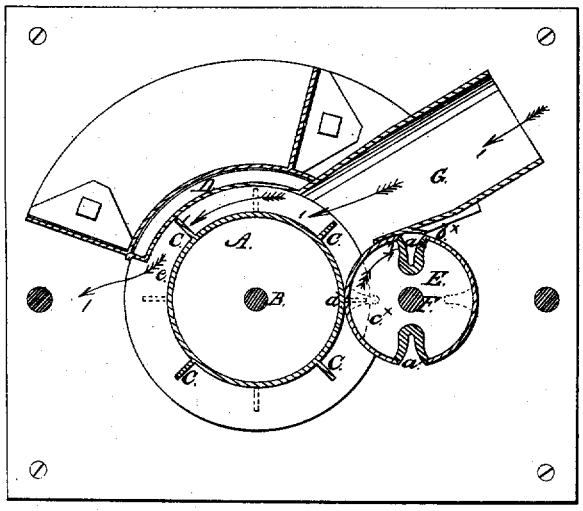

Figure 1 is a side view of my invention. Fig. 2 is a horizontal section of the same, taken in the line *x x*, Fig. 1.

Similar letters of reference indicate corresponding parts in the two figures.

This invention consists in using, in connection with a horizontal wheel provided with radial buckets, a rotating breast or abutment and a concave or apron, arranged substantially as hereinafter shown and described, whereby the water is made to act in a very direct and efficient manner on the wheel.

To enable those skilled in the art to fully understand and construct my invention, I will proceed to describe it.

A represents a horizontal wheel; B, its shaft; and C are buckets, which are attached radially to the wheel, as shown plainly in Fig. 2. The wheel A may of any proper dimensions, according to the power required or the volume or supply of water which is to drive it.

D is an apron or concave, which is placed at one side of the wheel A, and at such a distance from it as to allow the ends of the buckets C to just clear it as the wheel rotates. (See Fig. 2.) E is a cylinder which is placed vertically by the side of the wheel A, and is made to rotate simultaneously with it by means of gearing *a b*, the wheel *a* being on the shaft B of the wheel A, and the wheel *b* on the shaft F of the cylinder E. The wheel *a* is considerably larger than B, so as to give the cylinder *e* a quicker motion than the wheel A, the periphery of the former having a motion about one-third quicker than that of the latter. The periphery of the cylinder E just touches that of the wheel A, and the cylinder has two recesses, $a^{\times}$ $a^{\times}$, made in it to receive the buckets C, and thereby permit the running of the wheel and cylinder in contact. This will be clearly understood by referring to Fig. 2. G is an induction-pipe, which is placed between the cylinder E and the end of the apron D, said pipe communicating with the space between the periphery of the wheel A and the apron, said space being inclosed at its top and bottom by projecting rims or flanges *c c* on the wheel A, or by corresponding projections on the apron or concave.

The apron D and cylinder E occupy a space extending about half the circumference of wheel A—that is, estimating from the point of contact *d* of the cylinder E, and wheel A, to the end of the apron or concave. (See Fig. 2.)

The operation is as follows: The water passes through the induction pipe G between the wheel A and apron D, and acts directly against the buckets within said space, the wheel A being thereby rotated and the water escaping at the orifice *e*. The apron D and cylinder E confine the water, so as to cause it to act on the buckets, the cylinder E serving as a breast or abutment at the junction of the induction-pipe with the apron or concave.

It is essential that the rotary breast or abutment E have a quicker speed than the wheel, in order to permit the recesses *a a*, that receive the buckets, to be as narrow as possible. If the periphery of the cylinder E moved only with a speed equal to that of A, very large recesses would be required, as indicated by the red line $c^{\times}$ in Fig. 2, in order that the buckets might be received, and as these recesses fill with water and are discharged as they pass out of the water-way at $b^{\times}$, (see Fig. 2,) it follows as a matter of course that a considerable portion of the water would be lost. By increasing the speed of the breast or abutment this difficulty is avoided, and, as previously stated, the speed of the breast or abutment should exceed that of the wheel about one-third. The arrows 1 indicate the direction of the movement of the water, and the arrows 2 indicate the direction of the movement of the breast or abutment E, the wheel of course moving in the same direction as the water, as indicated by arrows 1.

By this invention the water is made to act in a very direct manner on the wheel A, but little power is lost by friction, and the water is not allowed to act as a "drag" on the wheel, but is discharged as soon as the most available part of its force is expended on the buckets.

The enlarged recess *z* in the abutment shows the form in which said recess must be made when the buckets are widened to the outer circle, *z'*. The buckets may be made wider or narrower at pleasure by making a corespondingchange in the shape and dimensions of the recesses.

It will be readily seen that without changing the form of the abutment, the wheel, or the concave, this apparatus may be used as a blower by simply revolving the wheel in a different direction. The buckets catch the air and force it with great power and rapidity into the proper pipes for conducting it to the furnace. Motion may be given to the wheel in any desired way when it is used for a blower.

All the parts may be constructed of cast metal—at least that would be the preferable material—and the wheel and abutment may be placed on a horizontal shaft, if desired.

Having thus fully described my invention, what I claim as new, and desire to secure by Letters Patent, is—

The wheel A and rotating breast or abutment E, moving with different degrees of velocity, in combination with the apron or concave D, the whole being arranged to operate as and for the purpose specified.

P. H. ROOTS.

Witnesses:
C. M. ALEXANDER,
A. A. YEATMAN.